UNITED STATES PATENT OFFICE.

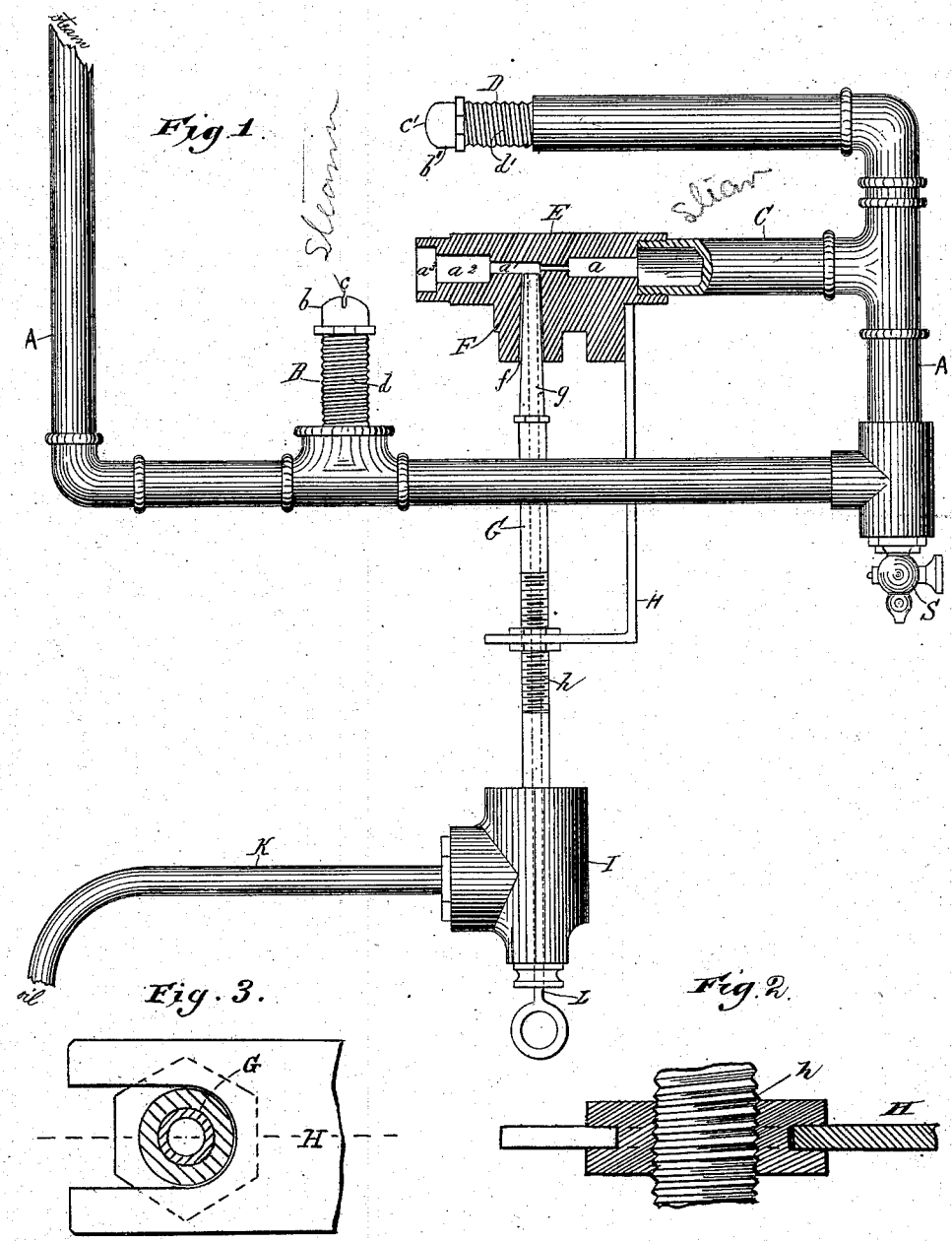

LEFFERT LEFFERTS, OF NEW YORK, N. Y.

HYDROCARBON-BURNER FOR FURNACES.

SPECIFICATION forming part of Letters Patent No. 289,424, dated December 4, 1883.

Application filed February 5, 1883. (No model.)

*To all whom it may concern:*

Be it known that I, LEFFERT LEFFERTS, of the city, county, and State of New York, have invented a new and useful Method of and Apparatus for Burning Oils or other Liquid Hydrocarbons for Heating Purposes, of which the following is a specification.

The object of my invention is to present the oil or other hydrocarbon to the point or place of combustion in a very finely divided or atomized state and mixed intimately with steam.

In the drawings, Figure 1 illustrates the apparatus referred to. Fig. 2 is a sectional view of bracket, nut, and threaded pipe; and Fig. 3 is a horizontal sectional view of same, the section being through annular recess in nut.

A represents a steam-pipe joined together by suitable connections, and having projecting therefrom the portions of pipe B, C, and D. The portion of pipe or jet B is covered by the cap $b$, provided with the slot $c$, and having cut on the outside a screw-thread, $d$, by which it is attached to the main pipe A. The portion of pipe or jet D has a similar cap, $b'$, and slot $c'$, and screw-thread $d'$, for similar purposes. The portions of pipe or jets B and D are so placed relatively to each other that steam issuing from the slot $c$ will be met at an angle, preferably a right angle, by steam issuing from the slot $c'$. Upon the pipe C is screwed or attached a tube or box, E, having a shoulder, F, projecting downward. Through the shoulder F is bored to the center of the box or tube E a tapering opening or passage, $f$, with its largest diameter at the outside. Through the box or tube E, at right angles to the opening $f$, is bored the opening or passage $a$, which is made parallel with the tube C, and is for a short distance about one-third the diameter of the pipe C. It is then contracted in diameter until it reaches the side of the tapering opening $f$. It is then again expanded either in a tapering form toward the other end of the box, or preferably by a series of different-sized enlargements forming shoulders $a'$ $a^2$ $a^3$.

The steam-pipe A may be provided with a stop-cock, S, for the purpose of allowing the escape of condensed steam. In the tapering opening $f$ of the shoulder F is placed the tapering nozzle $g$ of the pipe G. This pipe G is provided with the screw-thread $h$, working in a nut or frame, H, attached to the box E by any suitable means, said nut being formed with an annular recess cut inward the center of its periphery, in which the sides of frame H are inserted, and on which said nut freely turns, the remainder of said nut being formed angular to accommodate a wrench, as shown in Fig. 3. The lower end of the pipe G screws into the coupling-section I, from which runs the pipe K to an oil-reservoir. (Not shown in the drawings.) A stop-cock inserted near the reservoir in pipe K regulates the flow of oil. Through the coupling I and the pipe G is passed the cleaning-rod L.

The operation of my invention is as follows: The pipe G being placed in position so that the top of the nozzle $g$ is on a line with the contraction of the opening $a$ in the box E, steam is let into the pipe A, and immediately passes through the same, some of it escaping through the slit $c$ of pipe or jet B, and the remainder of the steam passing up to the pipe C and the pipe or jet D. Through the slit $c'$ of the latter pipe a small portion escapes; but the main body of steam, passing through the pipe C and the passage $a$ of the box E, is forced by the contraction thereof to pass with great rapidity over the opening of the nozzle $g$, carrying with it the air in said nozzle $g$, and, again expanding in the passages $a'$, $a^2$, and $a^3$, is discharged from the end of the box E immediately in the pathway of the steam escaping from the slit $c$. By this slit $c$ it is diverted upward into the path of the steam escaping from the slit $c'$, by which it is directed to the place of combustion. (Not shown in drawings.) The air in pipe G, rushing to supply the place of the air first removed from the nozzle $g$, allows the oil to ascend from the oil-reservoir through the pipes K and G until it reaches the nozzle $g$, where it is acted on by steam, as the air was at first. It is also mixed thoroughly with the steam in its passage through the portions $a'$ $a^2$ $a^3$ of the box E. The steam issuing from the slot $c$ further subdivides the oil, which is again further subdivided by the steam issuing from the slit $c'$, so that it is presented at the point or place of combustion in a very finely divided or atomized state. By shifting the position of the nozzle $g$ in the tapering opening $l$, so that there is more or less air-space between the sides of said space and the nozzle G, the flow of oil upward is controlled and regulated, the quantity of oil fed being increased or diminished, as desired, for the reason that lowering the oil-tube enlarges the air-space and allows a larger quantity of cold air to rush in and mix with the steam, causing a more rapid condensation of steam, thereby increasing the suction of oil through the oil-tube. Decreasing the air-space lessens the flow of oil through the oil-tube, for the reason that, the inflow of cold air being restricted, the condensation of the steam is less rapid and the suction of the oil in the oil-tube is diminished.

Any dirt or other foreign matter in the oil lodging in the pipe G may be removed by the cleaning-rod L.

Any other convenient means may be substituted for the screw-thread $h$ and nut or frame H for regulating the position of the nozzle $g$ in the tapering opening $f$.

I am aware of the English Patent No. 922 of 1867, Fig. 11, its construction and arrangement of parts, and therefore do not claim the same, broadly.

Having thus described my invention, what I claim, and desire to secure by Letters Patent, is—

1. In an apparatus for supplying oil or liquid hydrocarbon for combustion, the combination of a pipe for leading the oil from a reservoir, an adjustable opening for the admission of more or less air around the top of said oil-pipe, a supply-pipe for directing the current of steam across the mouth of the oil-pipe, and a discharge-pipe.

2. In an apparatus for supplying oil or other liquid hydrocarbon to the place of combustion in furnaces, &c., a steam-pipe, a pipe leading to the oil-reservoir, and an open air pipe or box around said oil-pipe, so arranged relatively to each other that the steam passes over the open ends of said oil and air pipes, and a jet or jets attached to said steam-pipe, so placed that steam issuing from said jet or jets is forced against the steam and oil issuing from the discharge-pipe, and acts to divide said steam and the oil carried with it into minute particles, said jets also directing said steam and oil toward the point of combustion.

3. In an apparatus for supplying oil or other liquid hydrocarbon to the place of combustion in furnaces, &c., a steam-pipe, a box or tube fitted on the open end of said steam-pipe, through which the steam passes toward the point of combustion, said box being provided with a shoulder in which is bored a tapering opening, an oil-pipe connected with the oil-reservoir, and provided with a tapering nozzle fitting loosely into said tapering opening in the shoulder of the box, and means for adjusting the position of said nozzle in said shoulder, substantially as and for the purpose set forth.

In testimony whereof I have hereunto set my hand this 30th day of January, 1883.

LEFFERT LEFFERTS.

In presence of—
JAS. J. CAMPBELL,
CHARLES G. COE.